Patented Mar. 6, 1951

2,544,243

UNITED STATES PATENT OFFICE 2,544,243

TREATMENT OF STORAGE ORGANS TO CONTROL SPROUTING

Haaye Veldstra, Amsterdam, Netherlands, assignor to N. V. Amsterdamsche Chininefabriek, Amsterdam, Netherlands, a company of the Netherlands No Drawing. Application March 14, 1946, Serial No. 654,506. In the Netherlands January 25, 1944

Section 1, Public Law 690, August 8, 1946
Patent expires January 25, 1964

9 Claims. (Cl. 71—2.5)

This invention relates to improvements in the treatment of storage organs to control the sprouting thereof, and is particularly directed to the treatment of seed potatoes and the like for the said purpose.

In laying in seed-potatoes, storage in daylight—in glass stores for seed-potatoes—is frequently resorted to at the present time. Owing to the effect of light, there is formed a short compact germ, the so-called "light germ," which is not easily damaged and makes it possible to work with seed-potatoes that are fully intact. In contradistinction herewith storage in dark (pit or potato hut) without benefit of the light effect causes a much faster and also stronger sproutforming at a time when such is not yet desired, with the consequence that these much longer sprouts are damaged during transport, further treatment and the like, die off and the potato must first shoot again before being planted.

As the greater part of the farmers do not use a glass store for seed-potatoes—the construction of such structures being expensive and requiring much more care in heating, etc., in winter—and in view of the desirability of using seed-potatoes, it may be said that there is a shortage of stores for seed-potatoes.

It is known that the sprouting of potatoes can be inhibited by treating them with growth substances (Contr. Boyce Thompson Inst. 10, 325 (1938); 11, 29 (1939); Landbouwk. Tijdschr. 54, 10, 611 (1942)) and it is also known that, when too small a quantity of growth substances is used for obtaining a complete inhibition, compact sprouts are formed, whereby it was already pointed out that it might be possible to obtain in this manner seed-potatoes with short compact sprouts (Chem. Weekbl. 40, 166 (1943)).

Experiments made in this connection showed that indeed with certain quantities of the growth substances, these quantities varying with the variety, seed-potatoes also when stored dark, having sprouts of the same type as the "light germ" can be obtained—which light germ is formed in the light in the store for the seed-potatoes—and as a consequence the sprout type obtained with the growth substances in the proper quantities offers all advantages stated above.

Seed-potatoes treated in this manner proved to behave perfectly normally when developing further, that is to say they give normal yields when being planted in heavier soils. On the other hand when being planted in lighter soils they may demonstrate a prolonged inhibition, which causes a reduction in the yield.

It has now been found that this prolonged inhibition on the lighter soils does not exist when part of the growth substances is replaced by substances inhibiting germination (blastokolin substances) and thus the light germ type is formed by applying mixtures of growth substances and inhibiting substances. In this manner all advantages mentioned above are therefore obtained, without the difficulty of a possible prolonged inhibition and without the decrease in yield in consequence thereof.

As growth substances all substances mentioned in the publications cited may be used, especially $\alpha$-naphthalene acetic methyl ester, $\alpha$-naphthalene acetic ethyl ester, $\beta$-indole acetic methylester, $\beta$-indole acetic ethylester, and especially also the $\alpha$-naphthalene acetonitrile to be prepared in a still simpler way, whereas as inhibiting substances all substances with properties inhibiting germination (blastokolin properties) (cf. Kuhn, Naturw. 31, 468 (1943)) may be used, such as coumarin, $\beta$-angelicalactone, parasorbic acid and suchlike compounds having an unsaturated lactone group.

The preparations according to the invention are obtained by mixing one or more growth substances, one or more substances having germination inhibiting properties (blastokolin properties) and one or more indifferent solid or liquid diluting agents. The total concentration of growth substance and that of inhibiting substance in the mixture preferably amount to a maximum of 2%, for the rest all possible mixing ratios being allowable.

As to the doses, it may in general be pointed out that the present mixtures have been formed to have a favourable effect even when applied in a physiological dilution (1:10,000 to 1:100,000), so that e. g. when employed on seed-potatoes the desired forming of the light germ is obtained in applying .1 gram of the mixture per hectolitre. This concentration varies with the growth substance and inhibiting substance chosen and the object to be treated.

It has further been found that the choice of the mixture to be applied is dependent on 1st the potato variety to be treated, 2nd the soil, on which the planting is effected and 3rd the measure of "warm-bloodedness" of the relative variety in the season considered. Seed-potatoes of the same variety may behave in a very different way regarding the early sprout forming in different years. How they will behave in this respect can be judged early in the autumn and in view of more or less "warm-bloodedness" the inhibiting characteristic of the mixture is made stronger or weaker.

For the manufacture of the present preparations the active substances may either be mixed with solid carriers or they may be dissolved or distributed in liquids. These preparations may then be distributed on the plants to be treated by sprinkling or spraying. Preparations with a solid carrier are preferable, as it has been found that with such carriers the phenomenon of "rot" occurs to a less extent, or may be completely suppressed.

The preparations according to the invention may also be mixed, if desired, with disinfectants, foodstuffs for plants to be applied for other reasons, etc. The preparations may also be applied on all other kinds of agricultural and horticultural products liable to shooting or sprouting when laid in. They have the great advantage that, when the products laid in are later planted, the disadvantages of a mere growth substance treatment, viz. prolonged inhibition, are not encountered.

The invention may be illustrated by the following example, without restricting the invention to the same.

1 kilogramme of talc is mixed with 6 grammes of α-naphthalene acetic methyl ester and 4 grammes of coumarin, with the inhibiting substance (coumarin) having been previously finely divided. The mixture obtained may be utilised for the treatment of 100 hectolitres of seed-potatoes of early or medium late varieties, or 20 hectolitres of late varieties respectively.

What I claim is:

1. A composition of matter for treating storage organs to control sprouting containing at least one growth substance and at least one growth inhibiting substance of blastokolin type and a substantially inert diluent in such an amount that the amount of the growth substance and of the growth inhibiting substance of blastokolin type together is not more than 2% of the total mixture.

2. A composition of matter which after dilution is suitable for treating storage organs to control sprouting containing alpha-naphthalene acetic methyl ester and coumarin.

3. A composition of matter which after dilution is suitable for treating storage organs to control sprouting containing alpha-naphthalene acetonitrile and beta-angelicalactone.

4. The method of treating storage organs to control sprouting which comprises subjecting the storage organs to the action of a mixture containing at least one growth substance and at least one growth inhibiting substance of blastokolin type and a substantially inert diluent in such an amount that the amount of the growth substance and of the growth inhibiting substance together is not more than 2% of the total mixture.

5. The method of treating storage organs, to control sprouting which comprises subjecting the storage organs to the action of a mixture containing alpha-naphthalene acetic methyl ester and coumarin.

6. The method of treating storage organs to control sprouting which comprises subjecting the storage organs to the action of a mixture containing alpha-naphthalene acetonitrile and beta-angelicalactone.

7. The method of treating storage seed potatoes to control sprouting which comprises subjecting the storage seed potatoes to the action of a mixture containing at least one growth substance and at least one growth inhibiting substance of blastokolin type and a substantially inert diluent in such an amount that the amount of the growth substance and of the growth inhibiting substance together is not more than 2% of the total mixture.

8. The method of treating storage seed potatoes to control sprouting which comprises subjecting the storage seed potatoes to the action of a mixture containing alpha-naphthalene acetic methyl ester and coumarin.

9. The method of treating storage seed potatoes to control sprouting which comprises subjecting the storage seed potatoes to the action of a mixture containing alpha-naphthalene acetonitrile and beta-angelicalactone.

HAAYE VELDSTRA.

REFERENCES CITED

The following references are of record in the file of this patent:

UNITED STATES PATENTS

| Number | Name | Date |
|---|---|---|
| 2,258,291 | Jones | Oct. 7, 1941 |
| 2,291,693 | Colla | Aug. 4, 1942 |
| 2,341,868 | Hitchcock | Feb. 15, 1944 |
| 2,395,446 | Benson | Feb. 26, 1946 |

FOREIGN PATENTS

| Number | Country | Date |
|---|---|---|
| 352,335 | Italy | Sept. 10, 1937 |
| 58,302 | Netherlands | Sept. 16, 1946 |

OTHER REFERENCES

Crocker, "Growth of Plants," published 1948, pp. 44, 45, 63 thru 66.

Pincus, "The Hormones," published 1948, vol. 1, pp. 40, 41, 42, 65 thru 74.